US012621583B1

(12) United States Patent
Kakarala et al.

(10) Patent No.: US 12,621,583 B1
(45) Date of Patent: May 5, 2026

(54) IMAGE SENSOR WITH LATERAL OVERFLOW INTEGRATING CAPACITOR (LOFIC) FOR HIGH DYNAMIC RANGE (HDR) AND SPLIT PIXEL FOR LIGHT EMITTING DIODE (LED) FLICKER MITIGATION

(71) Applicant: OMNIVISION TECHNOLOGIES, INC., Santa Clara, CA (US)

(72) Inventors: Ramakrishna Kakarala, Santa Clara, CA (US); Young Jun Song, Cupertino, CA (US); Zhongyang Huang, Singapore (SG)

(73) Assignee: Omnivision Technologies, Inc., Santa Clara, CA (US)

( * ) Notice: Subject to any disclaimer, the term of this patent is extended or adjusted under 35 U.S.C. 154(b) by 59 days.

(21) Appl. No.: 18/939,206

(22) Filed: Nov. 6, 2024

(51) Int. Cl.
H04N 25/585 (2023.01)
H04N 23/745 (2023.01)
(Continued)

(52) U.S. Cl.
CPC ......... H04N 25/585 (2023.01); H04N 23/745 (2023.01); H04N 25/46 (2023.01);
(Continued)

(58) Field of Classification Search
CPC .... H04N 23/745; H04N 25/46; H04N 25/535; H04N 25/583; H04N 25/585; H04N 25/59; H04N 25/702; H04N 25/771
See application file for complete search history.

(56) References Cited

U.S. PATENT DOCUMENTS 11,444,108 B2    9/2022  Mun et al.
2017/0251153 A1*  8/2017  Roffet .................. H04N 25/589
(Continued)

OTHER PUBLICATIONS

Asatsuma, T. et al., "Sub-pixel Architecture of CMOS Image Sensor Achieving over 120 dB Dynamic Range with less Motion Artifact Characteristics," International Image Sensor Society, Sep. 2019, 4 pages.

(Continued)

*Primary Examiner* — Daniel M Pasiewicz
(74) *Attorney, Agent, or Firm* — Christensen O'Connor Johnson Kindness PLLC

(57) ABSTRACT

A pixel array for CMOS image sensors with split pixel design for producing high dynamic range (HDR) images with LED Flicker Mitigation are disclosed herein. The pixel array is comprised of a plurality of pixel cells, each pixel cell comprising a pixel photodiode region having at least a large photosensitive element (LPD) and a small photosensitive element (SPD), wherein the LPD comprises a lateral overflow integrated capacitor (LOFIC). A method of generating an HDR image includes: exposing a large photosensitive element (LPD) of a pixel cell for a first duration of time, exposing a small photosensitive element (SPD) of the pixel cell for a second duration of time, and combining the resulting readouts into a combined pixel readout (CPR). This CPR is then utilized in combination with a generated LED Flicker Map (LFM) bit, and the resulting readout from the SPD to produce a final corrected pixel readout that mitigates LED flicker in the resulting HDR image.

19 Claims, 10 Drawing Sheets

(51) Int. Cl.

| | |
|---|---|
| *H04N 25/46* | (2023.01) |
| *H04N 25/583* | (2023.01) |
| *H04N 25/59* | (2023.01) |
| *H04N 25/702* | (2023.01) |
| *H04N 25/771* | (2023.01) |

(52) U.S. Cl.
CPC .......... *H04N 25/583* (2023.01); *H04N 25/59* (2023.01); *H04N 25/702* (2023.01); *H04N 25/771* (2023.01)

(56) References Cited

U.S. PATENT DOCUMENTS

| | | | | |
|---|---|---|---|---|
| 2019/0014276 A1* | 1/2019 | Cheung | ................ | H04N 25/533 |
| 2020/0177788 A1* | 6/2020 | Jiang | .................... | H04N 25/585 |
| 2022/0321759 A1* | 10/2022 | Miyauchi | ............. | H04N 25/583 |
| 2025/0338040 A1* | 10/2025 | Kim | .................... | H04N 25/778 |

OTHER PUBLICATIONS

Oh, Y., et al., "A 140 dB Single-Exposure Dynamic-Range CMOS Image Sensor with In-Pixel DRAM Capacitor," IEEE 2022 International Electron Devices Meeting (IEDM), Dec. 2022, 4 pages.
Sensing World "Sensing launches Omnivision's latest 8MP image sensor camera," Apr. 29, 2024, <https://www.sensing-world.com/en/nd.jsp?id=54&fromMid=336> [retrieved Jan. 29, 2025], 10 pages.
Funatsu, E., "Seeing is believing with today's CMOS image sensor technology," Laser Focus World, May 15, 2024 <https://www.laserfocusworld.com/detectors-imaging/article/55038385/seeing-is-believing-with-todays-cmos-image-sensor-technology> [retrieved Jan. 29, 2025], 4 pages.

* cited by examiner

*SNR*

IMAGE SENSOR WITH LATERAL OVERFLOW INTEGRATING CAPACITOR (LOFIC) FOR HIGH DYNAMIC RANGE (HDR) AND SPLIT PIXEL FOR LIGHT EMITTING DIODE (LED) FLICKER MITIGATION

BACKGROUND INFORMATION

Field of the Disclosure

This disclosure relates generally to image sensors, and in particular but not exclusively, relates to image sensors, such as high dynamic range (HDR) image sensors, that mitigate the effects of light emitting diode (LED) flicker in images.

Background

CMOS image sensors (CIS) have become ubiquitous. They are widely used in digital still cameras, cellular phones, security cameras, as well as medical, automobile, and other applications. The typical image sensor operates in response to image light reflected from an external scene being incident upon the image sensor. The image sensor includes an array of pixels having photosensitive elements (e.g., photodiodes) that absorb a portion of the incident image light and generate image charge upon absorption of the image light. The image charge of each of the pixels may be measured as an output voltage of each photosensitive element that varies as a function of the incident image light. In other words, the amount of image charge generated is proportional to the intensity of the image light, which is utilized to produce a digital image (i.e., image data) representing the external scene.

The typical image sensor operates as follows. Image light from an external scene is incident on the image sensor. The image sensor includes a plurality of photosensitive elements such that each photosensitive element absorbs a portion of incident image light. Photosensitive elements included in the image sensor, such as photodiodes, each generate image charge upon absorption of the image light. The amount of image charge generated is proportional to the intensity of the image light. The generated image charge may be used to produce an image representing the external scene.

Integrated circuit (IC) technologies for image sensors are constantly being improved, especially with the constant demand for higher resolution and lower power consumption. Such improvements frequently involve scaling down device geometries to achieve lower fabrication costs, higher device integration density, higher speeds, and better performance.

But as the miniaturization of image sensors progresses, defects within the image sensor architecture become more readily apparent and may reduce the image quality of the image. For example, excess current leakage within certain regions of the image sensor may cause high dark current, sensor noise, white pixel defects, and the like. These defects may significantly deteriorate the image quality from the image sensor, which may result in reduced yield and higher production costs.

High dynamic range (HDR) image sensors may present other challenges. For example, some HDR image sensor layouts are not space efficient and are difficult to miniaturize to a smaller pitch to achieve higher resolutions. Accordingly, systems and methods for improved HDR are still needed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
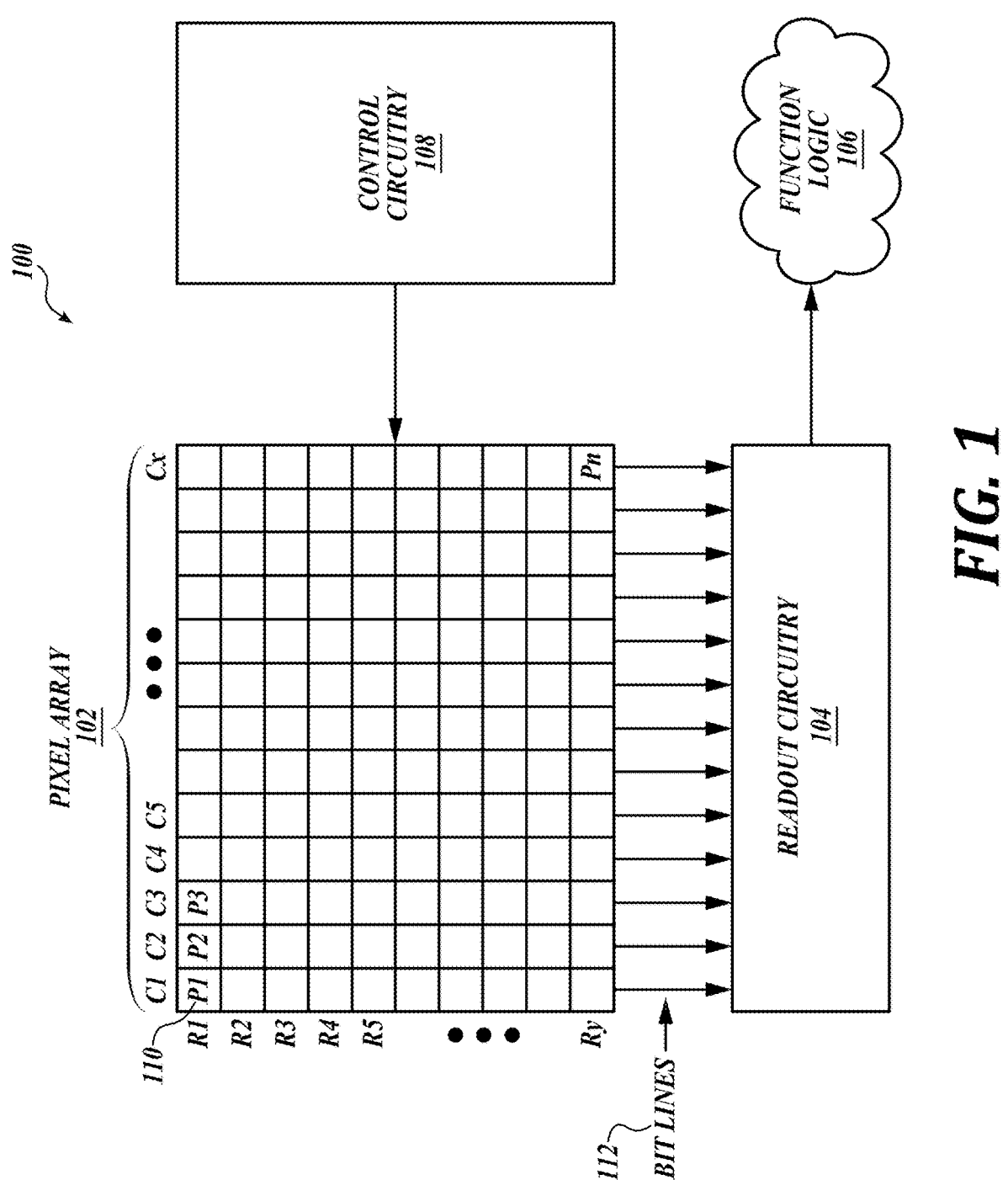
FIG. 1 is a block diagram illustrating an example image sensor in accordance with an embodiment of the present technology.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Examples of an apparatus and method for producing HDR images with CMOS image sensors using lateral overflow integrating capacitors (LOFIC) and LED flicker mitigation are described herein. Thus, in the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly.

Additionally, it will also be understood that when a layer is referred to as being "between" two layers, it can be the only layer between the two layers, or one or more intervening layers may also be present. Similarly, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the terms "about," "approximately," etc., mean +/−5% of the stated value.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be shown, examples of a pixel cell of an image sensor are disclosed. One or more of these examples can be arranged in a pixel array and employed, for instance, for high dynamic range imaging. In some examples, the pixel cells of the pixel array can each employ 4T or 5T pixel architectures. In some examples, a shared pixel cell architecture is employed in which two or more photoelectric conversion regions, such as photodiode regions, are coupled to a common floating diffusion via first and second transfer gates. Such shared pixel cell architecture may include pixel transistors such as a reset transistor, a source follower, a row select transistor, a dual floating diffusion transistor, etc.

CMOS image sensors such as these are frequently used in the automotive industry and require a clear image of not only vehicles and other obstacles, but also LED headlights, taillights, and road signs. While these LED indicators may appear to the naked eye to be constantly on, many of these indicators are designed to flicker at a high rate of frequency to prolong the life of these diodes and to save power. In some examples, LEDs flicker at a rate of 90 Hz, meaning that the emitted light is visible in 11.1 ms intervals. With conventional technologies, CMOS image sensors are generally exposed for only a fraction of that time because prolonged exposure generally results in a blurry image when either the image sensor or the subject of the photo are in motion. Therefore, these image sensors are only able to capture LED indicators if they are exposed at the correct time for the correct duration of time. However, prolonged exposure time also results in better spatial alignment across multiple readouts, as it allows the photodiode that comprise the image sensor to capture a greater quantity of image data that can be processed into a single corrected image. As such, exposure times of the various photodiodes must be manipulated and balanced to ensure that the final image is sufficiently clear.

To mitigate LED flickering while still capturing high quality images, existing image sensors utilize both a small photodiode (SPD) and a large photodiode (LPD), the results of which are combined into a single HDR image. In some examples, the SPD is exposed for approximately 11.1 ms and captures a single "short" readout(S). The S readout's longer exposure time allows the image sensor to mitigate LED flicker. In some embodiments, the SPD is exposed for as long as 12 ms. By contrast, the LPD may be exposed for 1-3 ms to capture three different readouts: a "high conversion gain" readout (HCG), a "low conversion gain" readout (LCG), and a "very short" readout (VS). In some instances, the HCG and LCG are captured on a first exposure of the LPD, while the VS readout is captured on a subsequent exposure. Because the LPD needs to be exposed twice to obtain all three readouts, there is still a risk of spatial misalignment in the final images arising from the time separation between the HCG/LCG signal obtained during the first exposure to the LED and the VS signal obtained during the second exposure to the LED.

In some examples, each pixel cell is configured according to a LOFIC architecture. In a pixel cell with a LOFIC architecture, or LOFIC pixel cell, a lateral overflow integrated capacitor (LOFIC) and an associated select transistor, sometimes referred to as a Dual Floating Diffusion (DFD) transistor, are provided. When, for example, a first floating diffusion (FD1) reaches saturation, the excess charge is routed to a second floating diffusion (FD2) and can be stored in the LOFIC. As a result, a photodiode has an increased full well capacity (FWC). Additionally, selective increases/decreases in the capacitance of the floating diffusion (FD) of the pixel cell can be utilized by, for example, change a voltage on one plate of the LOFIC capacitor to modulate its capacity. As a result, the dynamic range (e.g., HDR) of the pixel cell is increased.

In some examples, each LPD of each pixel cell is configured according to the LOFIC architecture. In this configuration, each LPD need only be exposed once to capture an HCG readout, an LCG readout, and a LOFIC readout. As such, there is no need to conduct a second LPD exposure, as the LOFIC captures the range of light intensities that were previously captured in the VS readout. In some embodiments, the LPD and the SPD are exposed simultaneously. In some other embodiments, the LPD is exposed before the SPD.

The inventive technology seeks to address issues associated with quickly collecting clear and complete HDR. For instance, examples of the disclosed subject matter aim to reduce blurring and mitigate LED flickering. In particular, examples of the disclosed subject matter reduce the number of photodiode exposures required for HDR imaging. While illustrative embodiments have been illustrated and described, it will be appreciated that various changes can be made therein without departing from the spirit and scope of the invention.

FIG. 1 is a block diagram illustrating an example image sensor in accordance with an embodiment of the present technology. Image sensor 100 may be implemented as complementary metal-oxide-semiconductor ("CMOS") image sensor. As shown in the example illustrated in FIG. 1, image sensor 100 includes pixel array 102 coupled to control circuitry 108 and readout circuitry 104, which is coupled to function logic 106.

The illustrated embodiment of pixel array 102 is a two-dimensional ("2D") array of imaging sensors or pixel cells 110 (e.g., pixel cells P1, P2, . . . , Pn). In one example, each pixel cell includes one or more subpixels or pixel regions that can be used for HDR imaging in accordance with technologies and methodologies of the present disclosure. As illustrated, each pixel cell 110 is arranged into a row (e.g., rows R1 to Ry) and a column (e.g., columns C1 to Cx) to acquire image data of a person, place or object, etc., which can then be used to render an image of the person, place or object, etc. As will be described in greater detail below, each pixel cell 110 (e.g., pixel cells P1, P2, . . . , Pn) may include, for example, a LOFIC and associated structure to provide, for example, HDR imaging in accordance with technologies and methodologies of the present disclosure.

In one example, after each pixel cell 110 has acquired its image data or image charge, the image data is read out by readout circuitry 104 through readout column bitlines 112 and then transferred to function logic 106. In various examples, readout circuitry 104 may include amplification circuitry (not illustrated), a column readout circuit that includes analog-to-digital conversion (ADC) circuitry, or otherwise. Function logic 106 may simply store the image data or even manipulate the image data by applying post image effects (e.g., crop, rotate, remove red eye, adjust brightness, adjust contrast, or otherwise). In one example, readout circuitry 104 may read out a row of image data at a time along readout column lines (illustrated) or may read out the image data using a variety of other techniques (not illustrated), such as a serial read out or a full parallel read out of all pixels simultaneously.

In one example, control circuitry 108 is coupled to pixel array 102 to control operational characteristics of pixel array 102. For instance, in one example control circuitry 108 generates the transfer gate signals and other control signals to control the transfer and readout of image data from the subpixels or pixel regions of the shared pixel cell 110 of pixel array 102. In addition, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. The shutter signal may also establish an exposure time, which is the length of time that the shutter remains open. In one embodiment, the exposure time is set to be the same for each of the frames.

In one example, the control circuitry 108 may control the timing of various control signals provided to the pixel cell 110 to reduce the dark current associated with floating diffusions of each of the pixel cells 110. The pixel cells 110, in some non-limiting embodiments, may be what are known as 4T pixel cells, e.g., four-transistor pixel cells. In other non-limiting embodiments, the pixel cells 110 may be what are known as 5T pixel cells, e.g., five-transistor pixel cells, including a 5T pixel cell having a LOFIC architecture. For example, the pixel cells 110 in some non-limiting embodiments may further include a dual floating diffusion (DFD) transistor and an associated capacitor (e.g., LOFIC). The associated capacitor may be selectively coupled via the dual floating diffusion transistor to increase/decrease the capacitance of the floating diffusion, which can modulate conversion gains.

In one example, image sensor 100 may be included in a digital camera, cell phone, laptop computer, or the like. Additionally, image sensor 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to image sensor 100, extract image data from image sensor 100, or manipulate image data supplied by image sensor 100.

Figure 2:
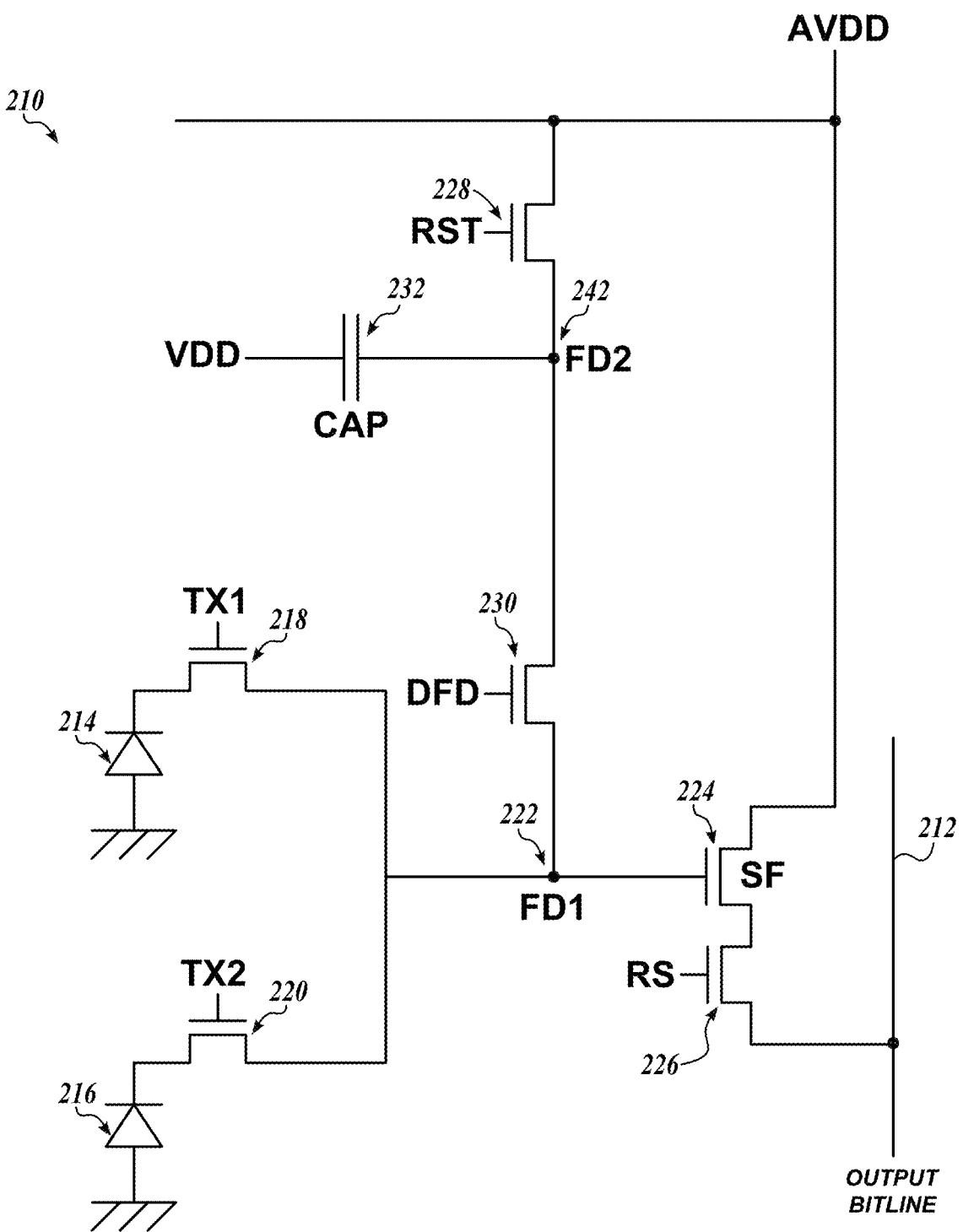
FIG. 2 is an illustrative schematic of one example of a pixel cell in accordance with an embodiment of the present disclosure.

FIG. 2 is an illustrative schematic of one example of a pixel cell 210 in accordance with the teachings of the present disclosure. It is appreciated that pixel cell 210 of FIG. 2 may be an example of a pixel cell 110 of FIG. 1, and that similarly named and numbered elements referenced below may be coupled and function similar to as described above. For example, the pixel cell 210 may be coupled to a bitline, e.g., readout column, which may provide image data to readout circuitry, such as the readout circuitry 106, and the pixel cell 210 may receive control signals from control circuitry, such as control circuitry 108, to control the operation of the various transistors of the pixel cell 210. The control circuitry may control the operation of the transistors in desired sequences with relative timing in order to reset the pixel to a dark state, for example, and to read out image data after an integration, for example.

The illustrated example of the pixel cell 210 includes a first photosensitive or photoelectric conversion element, such as first photodiode 214, and a second photosensitive or photoelectric conversion element, such as second photodiode 216. In operation, the first and second photodiodes 214, 216 are coupled to photogenerate image charge in response to incident light. In an embodiment, the first and second photodiodes 214, 216 can be used to provide image data for a high dynamic range (HDR) image, for example. In an embodiment, the first photodiode 214 is a large photodiode (LPD), and the second photodiode is a small photodiode (SPD).

Pixel cell 210 also includes a first transfer gate 218, a second transfer gate 220, and first floating diffusion (FD1) 222 disposed between the first and second transfer gates 218, 220. First transfer gate 218 is coupled to transfer image charge from first photodiode 214 to the first floating diffusion 222 in response to a first transfer gate signal TX1. Second transfer gate 220 is coupled to transfer image charge from second photodiode 216 to the first floating diffusion 222 in response to a second transfer gate signal TX2. In the depicted arrangement, the first floating diffusion 222 is common to both the first and second photodiodes 214, 216, and can be referred to as a common floating diffusion 222.

A reset transistor 228 is coupled to the common floating diffusion 222 to reset the pixel cell 210 (e.g., discharge or charge the first and second photodiodes 214, 216, and the floating diffusion 222 to a preset voltage) in response to a reset signal RST. The gate terminal of an amplifier transistor 224 is also coupled to the first floating diffusion 222 to generate an image data signal in response to the image charge in the first floating diffusion 222. In the illustrated example, the amplifier transistor 224 is a source-follower (SF) transistor. A row select transistor 226 is coupled to the source-follower (SF) 224 to output the image data signal to an output bitline 212, which is coupled to readout circuitry such as readout circuitry 104 of FIG. 1, in response to a row select signal RS.

In another example embodiment, a dual floating diffusion transistor (DFD) 230 may be optionally coupled between the floating diffusion 222 and the reset transistor 228. A capacitor (CAP) 232, such as a LOFIC, also may be optionally included and coupled to the dual floating diffusion transistor 230 to form a LOFIC pixel cell. When included, a second floating diffusion (FD2) 242 is formed between the reset transistor 228 and the dual floating diffusion transistor 230. In operation, the dual floating diffusion transistor 230 is adapted to couple the capacitor 232 to the floating diffusion 222 in response to a dual floating diffusion signal DFD to provide additional dynamic range capabilities to the pixel cell 210 if desired. In the depicted arrangement, the capacitor 232 is also coupled to a voltage, such as voltage VDD adjusting the capacitance of the capacitor 232 for storing the charges overflowing from the pixel cell 210.

Control signals TX1 and TX2 enable the transfer gates 216, 218 to transfer the charges from the photodiodes 214, 216 to the first floating diffusion 222. The amount of charge transferred from the photodiodes to the floating diffusion 222 may depend on a current operation of the pixel cell 210. For example, during a reset operation, the charge may be charge that is generated during a dark state of the photodiode (s), but during an integration, the charge may be a photo-generated image charge. At the end of an integration, the image charge may be read out twice with one or more dark readings occurring in between to perform correlated double sampling (CDS).

Figures 3A, 3B:
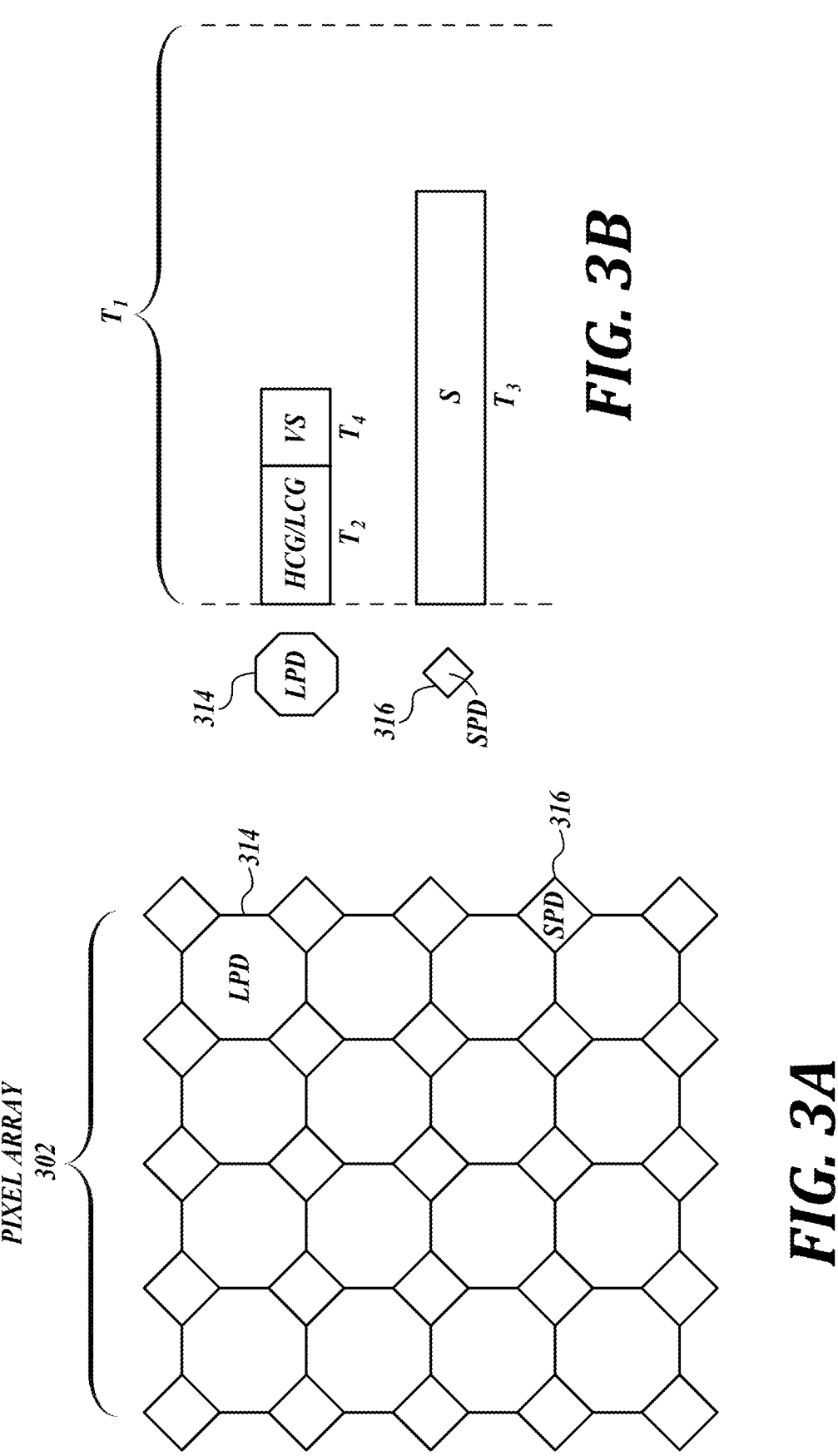
FIGS. 3A-3B are examples of a pixel array and its associated timing diagram, respectively, in accordance with an embodiment of the present disclosure.

FIGS. 3A-3B are examples of the pixel array 302 and its associated timing diagram in accordance with an embodiment of the present disclosure. FIG. 3A depicts an embodiment that includes a plurality of first photodiodes 314 and a plurality of second photodiodes 316 configured in a split pixel array. In the illustrated embodiment, the first photodiode 314 is a large photodiode (LPD) and the second photodiode 316 is a small photodiode (SPD). In a split pixel array, the plurality of LPDs and the plurality of SPDs are each arranged into rows and columns, such that adjacent LPDs share common boundaries with each other and the SPDs are embedded between the LPDs, creating a tessellating pattern. However, in different embodiments, other spatial arrangements of the SPDs and LPDs are also available. According to this embodiment of the prior art, there is no LOFIC connected to either photodiode.

FIG. 3B depicts a timing diagram according to this embodiment, describing the timing and duration of the exposures for first photodiode 314 and second photodiode 316 to generate corresponding readouts. The timing diagram depicts a first duration of time T1. In some embodiments, T1 is 16.6 ms, depicting a frame rate of 60 frames per second (FPS). In this embodiment, because there is no LOFIC, the LPD 314 is exposed twice. The first exposure has a duration of time T2. In some embodiments, T2 is approximately 1-3 ms. In this embodiment, during the first exposure, the LPD 314 captures the HCG and LCG readouts. In this embodiment, the second exposure immediately follows the first exposure and has a duration of time T4. In some embodiments, T4 has a duration of 1 ms. During the second exposure, the LPD 314 captures the very short (VS) readout.

Furthermore, in this embodiment, the SPD 316 is exposed during the same time for a duration of time T3, capturing the short(S) readout. In some embodiments, T3 has a duration of approximately 11.1 ms. Because the second exposure follows the first exposure temporally, the second exposure necessarily captures a slightly different scene than the first exposure captures. This difference may, for example, be a result of the scene changing around the LPD or the LPD being in motion (e.g., when the pixel array as described in this embodiment is incorporated into an automobile). As such, the resulting image may be blurry, which may negatively impact automated processing based on the resulting image (e.g., automatic emergency braking) or the user experience more broadly.

Figure 4A:
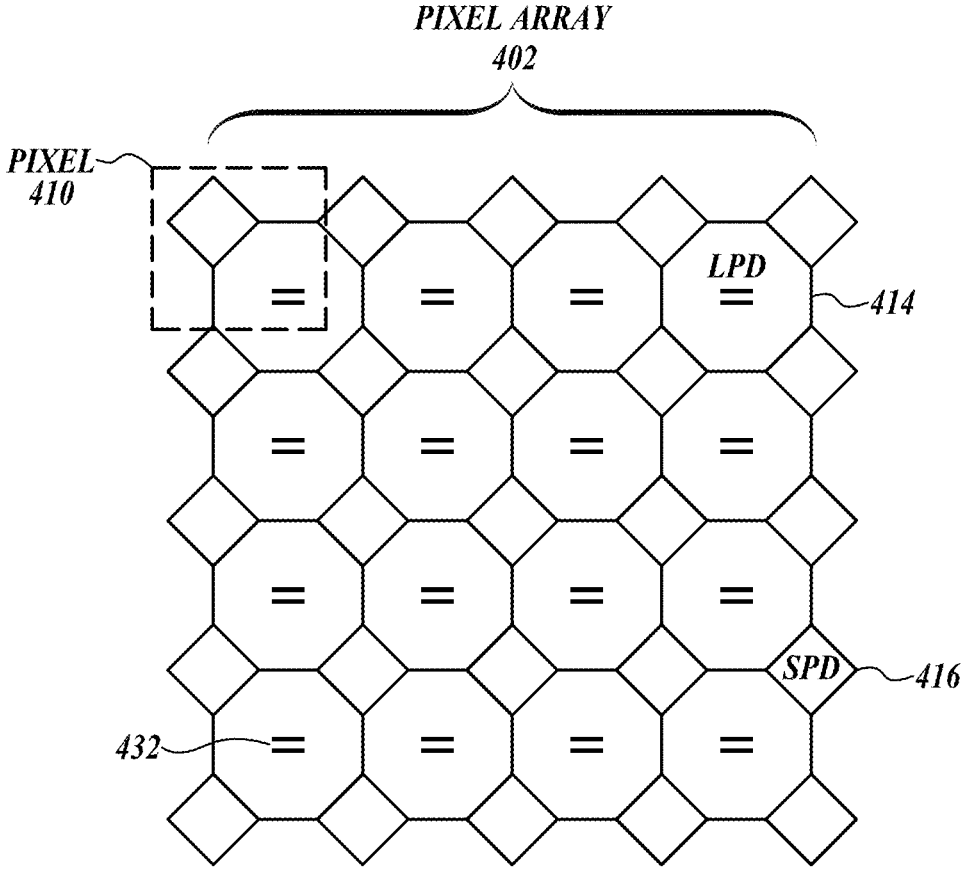
FIGS. 4A-4C are embodiments of pixel arrays in accordance with the present disclosure.
Figures 4B, 4C:
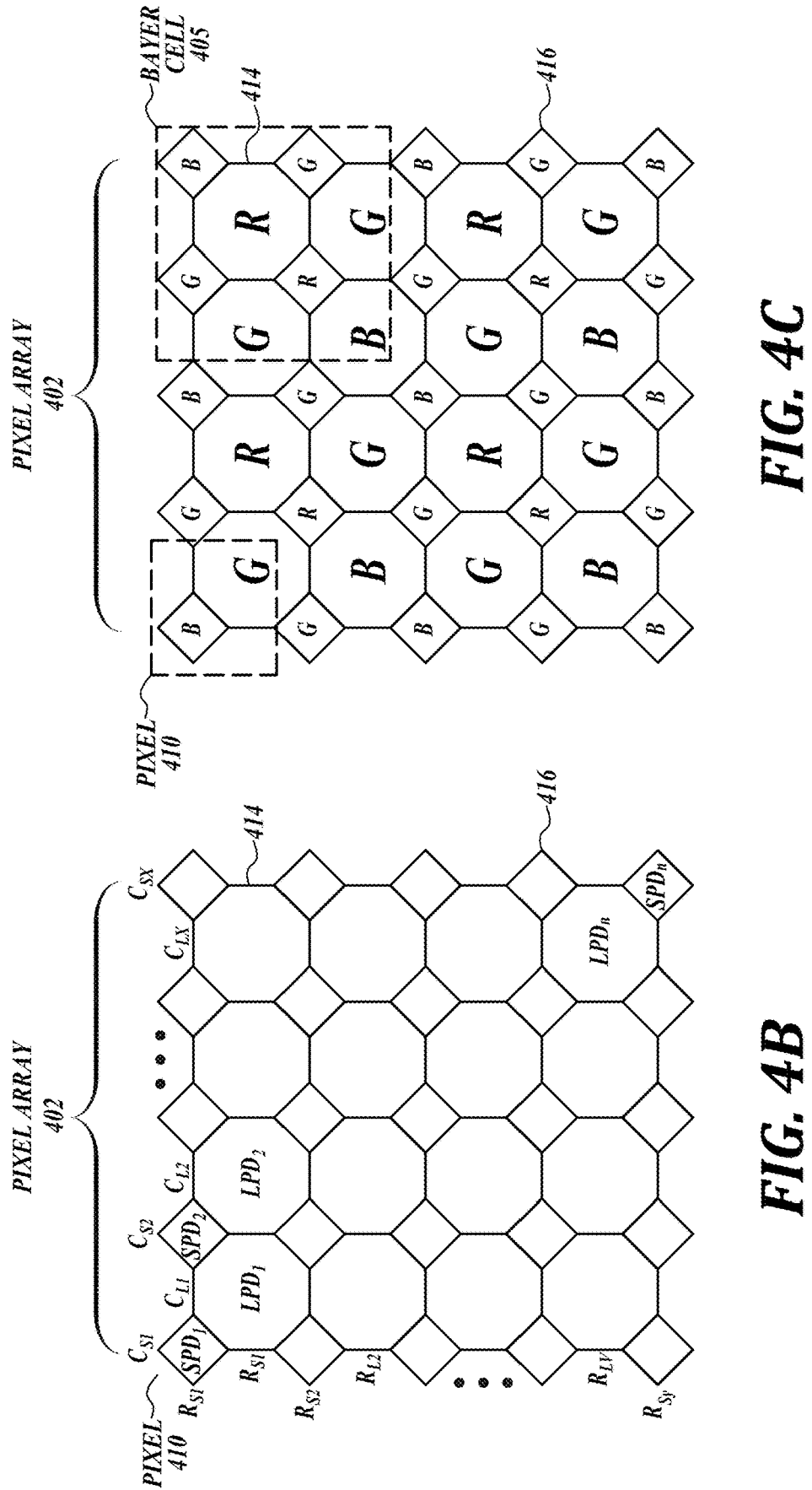

FIGS. 4A-4C are embodiments of pixel array 402 in accordance with the present disclosure. FIG. 4A depicts this embodiment, which includes a plurality of first photodiodes 414 and a plurality of second photodiodes 416 configured in a split pixel array. In the illustrated embodiment, the first photodiode 414 is a large photodiode (LPD) and the second photodiode 416 is a small photodiode (SPD). In the illustrated pixel array 402, the plurality of LPDs and the plurality of SPDs are each arranged into rows and columns, such that adjacent LPDs share common boundaries with each other and the SPDs are embedded between the LPDs, creating a tessellating pattern. According to this embodiment of the present disclosure, each LPD 414 is electrically coupled to a LOFIC 432, which enables a higher dynamic range of the LPD.

FIG. 4B depicts the split diode tiling arrangement of this embodiment of the present disclosure, illustrating the plurality of LPDs 414 (e.g., LPD$_1$, LPD$_2$, . . . , LPD$_n$) and SPDs 416 (e.g., SPD$_1$, SPD$_2$, . . . , SPD$_n$) that form the pixel array 402. As illustrated, each LPD 414 is arranged in a row (e.g., rows R$_{L1}$ to R$_{Ly}$) and a column (e.g., columns C$_{L1}$ to C$_{Lx}$). Similarly, each SPD 416 is arranged in a row (e.g., rows R$_{S1}$ to R$_{Sy}$) and a column (e.g., columns C$_{S1}$ to C$_{Sx}$). Each LPD 414 is arranged adjacent to each other such that, for example, it shares a common boundary with the adjacent LPDs 414. Each SPD 416 is then embedded between adjacent LPDs 414 such that the two photodiodes (LPD and SPD) of the same pixel share common boundaries with each other. This arrangement has the visual appearance of a tessellating tiling pattern of photodiodes 414, 416, without gaps or overlaps between adjacent photodiodes 414, 416. This arrangement allows for the simultaneous and spatially proximal exposure of LPDs 414 and SPDs 416 which, according to this embodiment, results in the simultaneous capture of HCG, LCG, LOFIC, and S readouts. However, in other embodiments, other spatial arrangements of the LPDs and SPDs of the same pixel are also possible.

FIG. 4C illustrates an example arrangement of photodiodes 414, 416 according to their color sensitivity. In the illustrated embodiment, the pixel array 402 is comprised of a plurality of Bayer cells 405, each of which includes a plurality of pixels 402. As described above, each pixel includes a plurality of LPDs 414 and SPDs 416. In the illustrated embodiment, the plurality of LPDs 414 and SPDs 416 each have a distribution of two green (G), one blue (B), and one red (R) photodiode of their respective sizes in each Bayer cell 405. These color sensitivities for the individual photodiodes alternate according to their respective rows and columns. For example, the LPDs 414 in row R$_{L1}$ will alternate by color (R and G in the illustrated example), while the SPDs 416 in column C$_{S1}$ will also alternate by color (B and G in the illustrated example). Subsequent rows and columns may alternate according to different color pattern.

For example, the LPDs 414 in row R$_{L2}$ may alternate between B and G, while the SPDs 416 in column C$_{S2}$ may alternate between R and G, as illustrated. This allows for a wide range of colored light to be captured and subsequently processed to provide images.

Figure 5A:
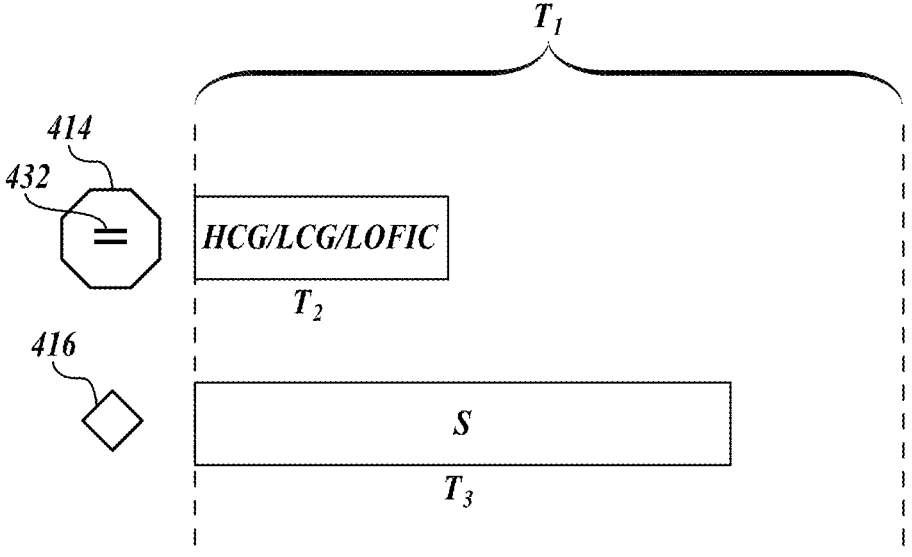
FIG. 5A is a timing diagram in accordance with an embodiment of the present disclosure.

FIGS. 5A-5D are an illustration of timing diagrams and graphical depictions of the resulting Signal-to-Noise Ratio (SNR) in accordance with different embodiments of the present disclosure. FIG. 5A is a graph of timing diagram in accordance with an embodiment of the present disclosure. In this embodiment, the timing diagram depicts a first duration of time T during which the photodiodes 414, 416 are exposed to light. In some embodiments, T1 is 16.6 ms, depicting a frame rate of 60 frames per second (FPS), thus ensuring a capture of at least one active period of an LED flickering at 90 Hz. Because the illustrated LPD 414 includes a LOFIC 432, the LPD needs only be exposed once to capture the entire HDR of the scene. Such exposure of the LPD 414 exposure has a duration of time T2. In some embodiments, T2 is less than 5 ms. In the illustrated example, T2 is approximately 1-3 ms. In this embodiment, during its exposure, the LPD 414 captures the HCG, LCG, and LOFIC readouts. In this embodiment, the SPD 416 is exposed concurrently with the LPD 414 for a duration of time T3. In some embodiments, T3 is greater than or equal to 11 ms. In the illustrated example, T3 has a duration of approximately 11.1 ms. The resulting readout of the SPD 416 is referred to as a short(S) readout.

Figure 5B:
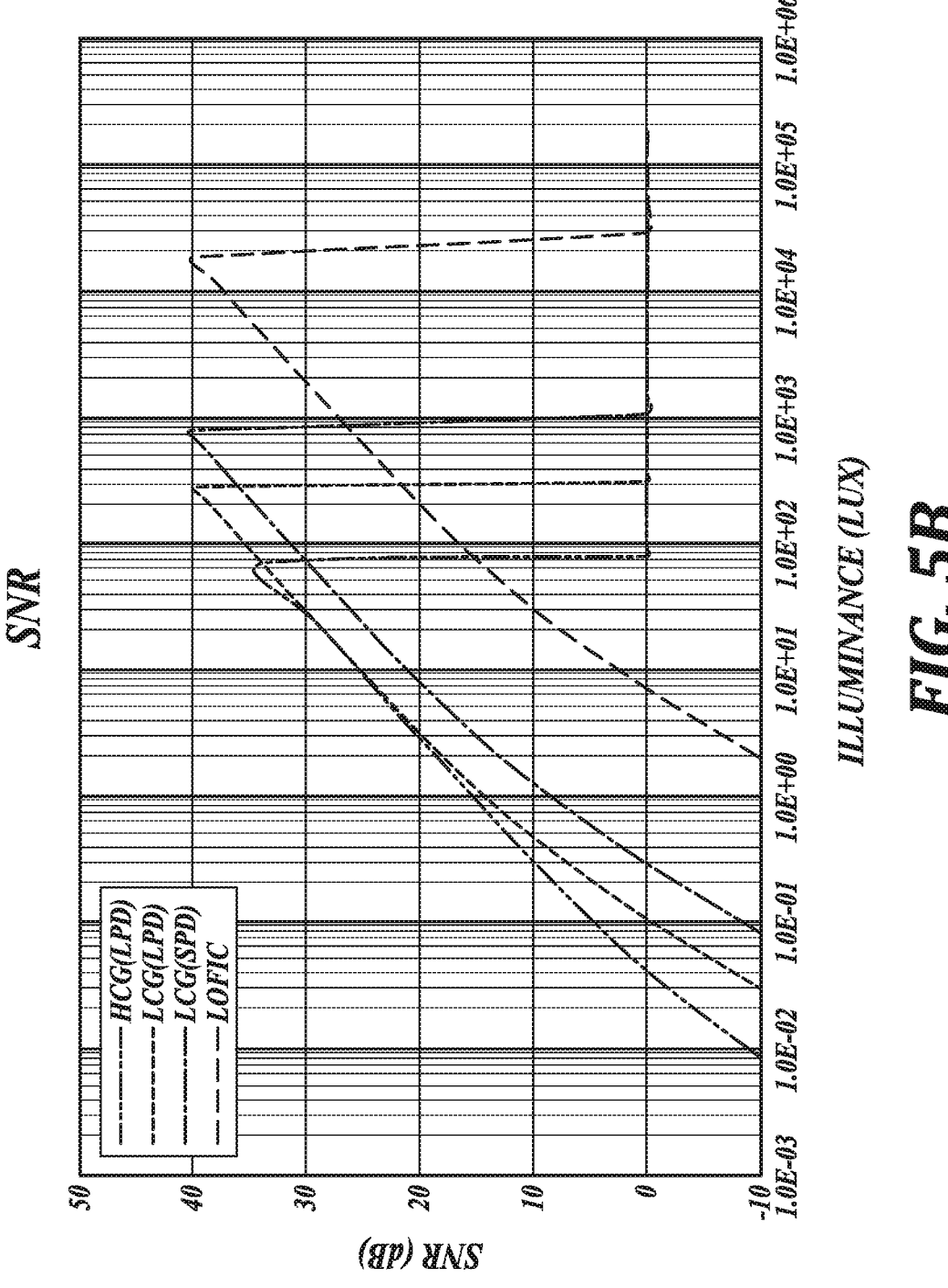
FIG. 5B is a graph of a Signal-to-Noise Ratio (SNR) related to the timing diagram of FIG. 5A.

FIG. 5B is a graph of SNR (vertical axis, measured in decibels) as a function of Illuminance (horizontal axis, measured in lux) for each of the four collected readouts of FIG. 5A. The end of the monotonically increasing period for each readout indicates its saturation point, beyond which the SNR rapidly falls. The distribution of these monotonically increasing periods for different readout assures a capture of an image under different illuminance conditions. For example, the LOFIC 432 that is electrically coupled with the LPD 414 will be most capable of capturing high illuminance while, on the other hand, being least responsive to the low illuminance. Conversely, the high conversion gain (HCG) and low conversion gain (LCG) readouts of the LPD 414 will have comparatively good response to the low illuminance but will also saturate sooner than the LOFIC (at about 80 and 300 lux, respectively). In the illustrated embodiment, the SPD exposure of the LCG (indicated by a dashed line) covers "a mid-range," so to say, of the illuminance. As such, the illustrated embodiment relies upon the SPD's 416 prolonged exposure to assure capturing LED flicker; however, doing so restricts the range of illuminances wherein LED flicker may be captured to those illuminances captured by the SPD 416 (in the illustrated example, a range of approximately 0.316 lux to 1000 lux).

Figure 5C:
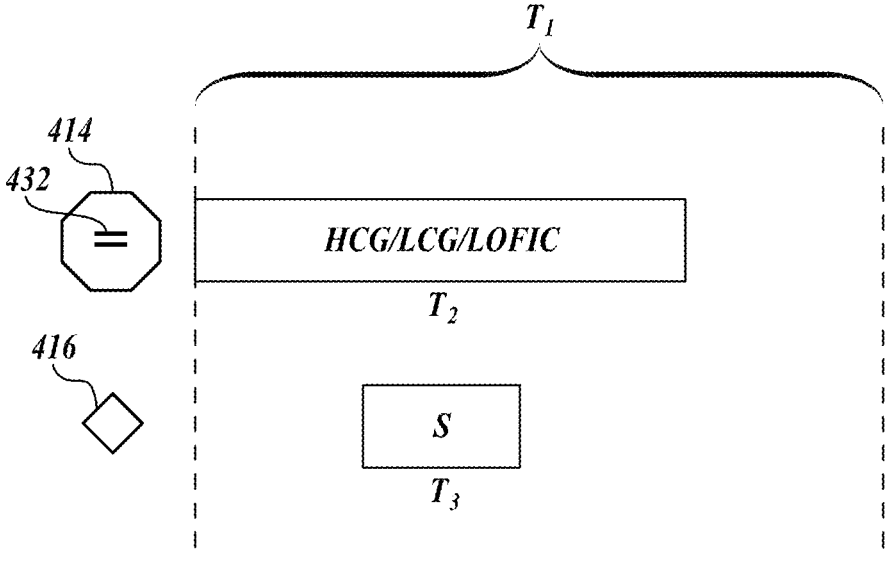
FIG. 5C is a timing diagram in accordance with an embodiment of the present disclosure.

FIG. 5C is a timing diagram in accordance with another embodiment of the present disclosure. In this embodiment, the timing diagram depicts a first duration of time T$_1$. In some embodiments, T$_1$ is 16.6 ms, which correlates to a frame rate of 90 FPS. Because the LPD 414 includes a LOFIC 432, the LPD needs only be exposed once. The LPD 414 exposure has a duration of time T$_2$. In some embodiments, T$_2$ is greater than or equal to 11 ms. In the illustrated example, T$_2$ is approximately 11.1 ms. In this embodiment, during its exposure the LPD 414 captures the HCG, LCG, and LOFIC readouts over a longer period of time, allowing the LPD 414 to capture the flickering of any LED that may be present across these three readouts, as further explained with respect to FIG. 5D below. Thus, the illustrated embodiment has the benefit of increasing the range of illuminances in which a LED image may be captured by the pixel array 402 despite the flicker of the LED. In this embodiment, the exposure time T$_3$ of the SPD 416 is delayed, and the exposure of the SPD starts after LPD 414 has already started. In some embodiments, T$_3$ has a duration of less than 5 ms. In the illustrated example, T$_3$ has a duration of 3 ms.

Figure 5D:
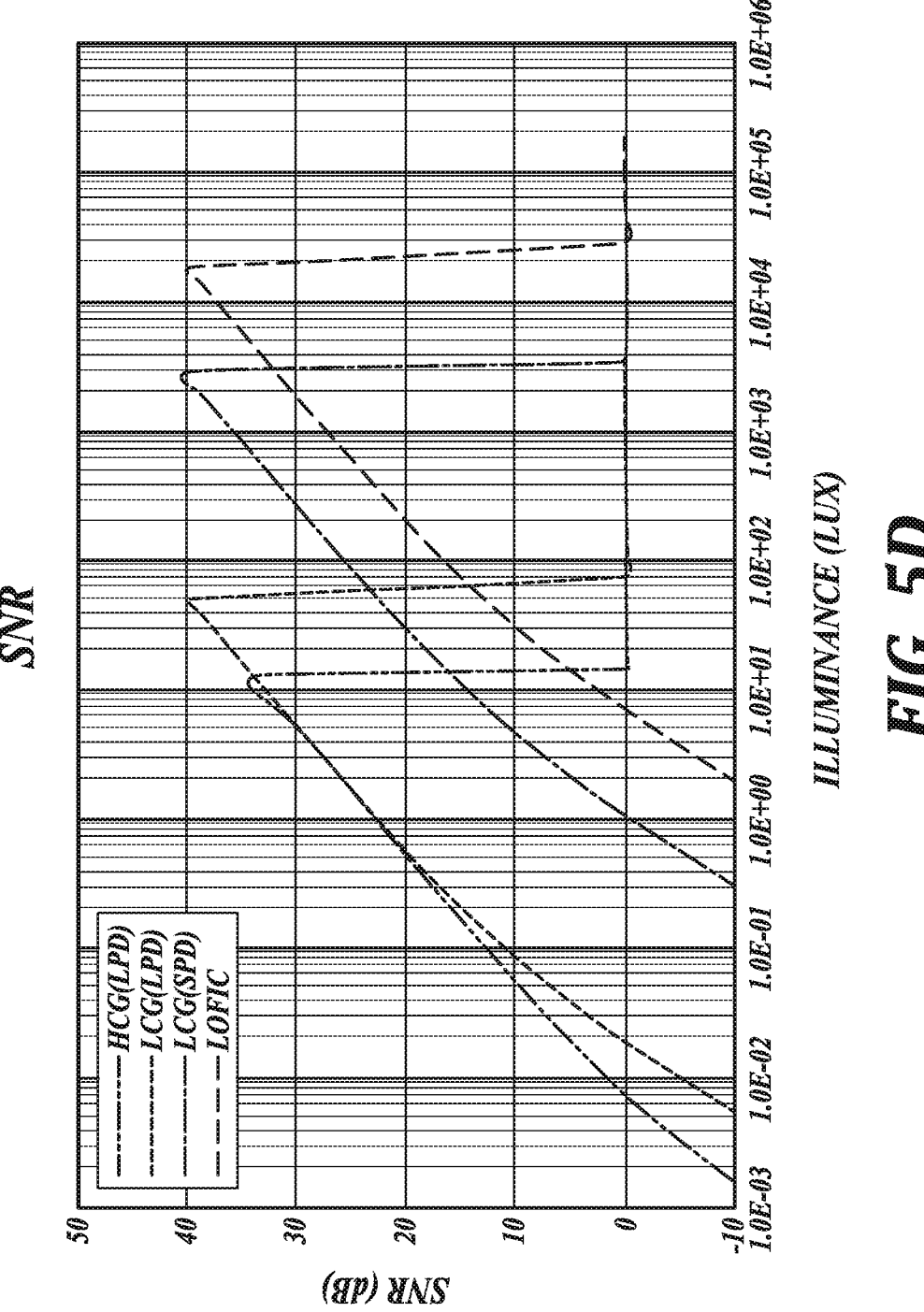
FIG. 5D is a graph of a Signal-to-Noise Ratio (SNR) related to the timing diagram of FIG. 5C.

FIG. 5D is a graph of SNR (vertical axis, measured in decibels) as a function of Illuminance (horizontal axis, measured in lux) for each of the four collected readouts of FIG. 5C. FIG. 5D is somewhat analogous to FIG. 5B. As described in relation to FIG. 5B, the end of the monotonically increasing period for each readout indicates its saturation point, beyond which the SNR rapidly falls. The distribution of these monotonically increasing periods for different readout assures a capture of an image under different illuminance conditions. In the illustrated embodiment, however, the LPD 414 is exposed for a longer duration of time than the SPD 416. By virtue of the LPD's 414 prolonged exposure, there is a higher SNR in low light conditions as compared to previous embodiments. Additionally, the range of illuminance wherein LED flicker can be detected increases over other embodiments. In the illustrated example, the range spans from approximately 0.007 lux to 31,622 lux. This captures a significantly wider range of illuminances than the embodiment described in FIG. 5B, with the lower end of the captured range decreasing from 0.316 lux to 0.007 lux, and the upper end of the captured range increasing from 1,000 lux to 31,622 lux. The illustrated embodiment has advantages in instances where the pixel array is tasked with capturing LED flicker while exposed to a greater range of illuminances—for example, as an automobile emerges into the daylight from a dark tunnel. However, the illustrated embodiment is not without drawbacks. As discussed above, the likelihood of a blurry image increases as the duration of a photodiode's exposure increases. Therefore, while the longer exposure of the LPD 414 produces better spatial alignment across three of the four collected readouts (HCG, LCG, and LOFIC) it also increases the likelihood of a blurry image in those same readouts.

Figure 6:
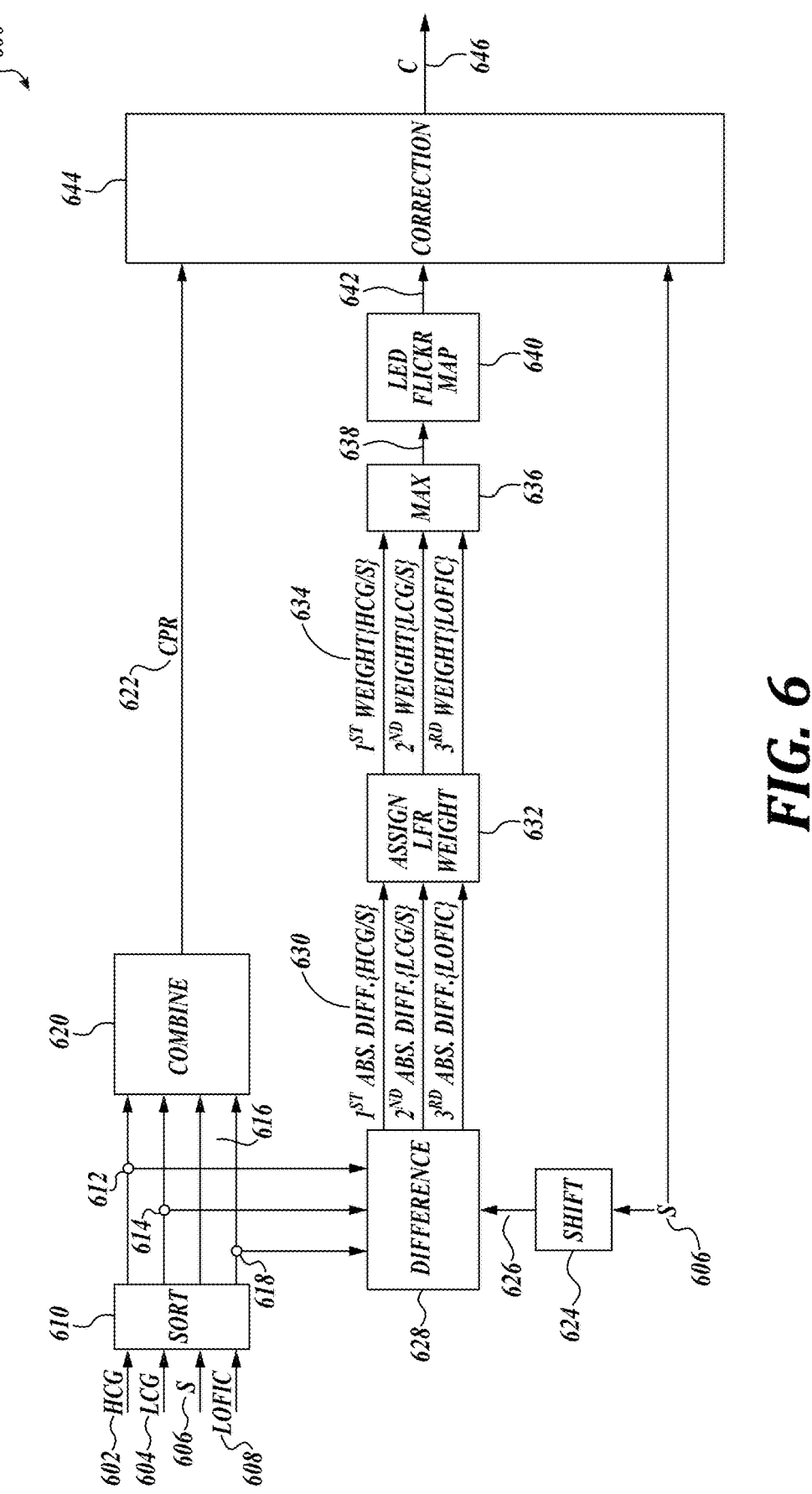
FIG. 6 is a schematic of signal processing in accordance with an embodiment of the present disclosure.

FIG. 6 is an illustration of an example HDR and Led Flicker Mitigation (LFM) Engine (HALE) processing chain 600 in accordance with an embodiment of the present disclosure. The processing chain 600 illustrates a process by which the photodiode readouts (e.g., HCG 602, LCG 604, S 606, and LOFIC 608) are converted into a corrected output (C) 646. As discussed above, following the photodiode exposure according to either embodiment, the LPD 414 produces the HCG readout 602, LCG readout 604, and LOFIC readout 608; while the SPD 416 produces an S readout 606. A corrected output 646 requires three inputs: a combined pixel readout (CPR) 622, the S readout 606, and an LED flicker map (LFM) Bit 642. The CPR 622 is produced first by the operation of a sort module 610, which produces outputs 616 that feed into a combine module 620, which combines the HCG readout 602, the LCG readout 604, S readout 606, and the LOFIC readout 608 to generate the combined pixel readout (CPR) 622, which is an HDR image that is routed to a correction module 644 The sorted HCG readout 612, sorted LCG readout 614, and sorted LOFIC readout 618 will also be further utilized in the determination of the LFM Bit 642.

Some amount of LED flicker can be captured by photodiodes of either size, though the LED flicker is most likely to be captured by the photodiode with a longer exposure time. As such, an LFM Bit 642 is produced to ensure that the LED image or information is conveyed in the corrected output 646 of the correction module 642. This may be accomplished by first processing the S readout 606 through a spatial shift interpolation 624, which corrects for the spatial misalignment of the SPD and consolidates the S readout 606 into a shifted S signal 626 that is more directly comparable with that of the sorted HCG readout 612, sorted LCG readout 614, and sorted LOFIC readout 618. In some embodiments, spatial shift interpolation 624 is performed in both the horizontal and vertical directions, to correct for spatial misalignment across both SPD rows (e.g., FIG. 4B, rows $R_{S1}$ to $R_{Sy}$) and columns (e.g., FIG. 4B columns $C_{S1}$ to $C_{Sx}$). The four readouts may then be utilized in a difference module 628 to determine a trio of absolute differences (Abs. Diff.) 630: a first absolute difference between the sorted HCG readout 612 and the shifted S readout 626; a second absolute difference between the sorted LCG readout 614 and the shifted S readout 626; and a third absolute difference between the sorted LOFIC readout 618 and the shifted S readout 626. These absolute differences 630 may be adjusted based on exposure ratio between the compared readouts, which in turn may vary based upon factors such as exposure time, gain, and pixel sensitivity. The absolute differences 630 account for different brightnesses captured by each readout, such that the LED flicker that is incompletely captured in the short exposure LPD readouts 602, 604, 608 and completely captured in the long exposure SPD readout 606 is utilized in the production of the LFM bit 642.

The absolute differences 630 are then processed by a module 632 to assign an equivalent trio of LED Flicker Reduction (LFR) weights 634—one weight for each of the determined absolute differences described above. These weights are assigned first by establishing a threshold for each difference to account for noise, as well as those that are incorrect due to, for example, saturation. Next, each weight 634 is assigned proportionally to its respective difference 630, such that the weight 634 is a monotonically increasing function of its corresponding difference 630. The weight 634 may then be scaled to produce a value between 0 and 1, such that a greater weight 634 signifies a greater likelihood that LED flicker is captured by the shifted S readout 626, as there is a greater difference between the S readout 626 and the readout to which it was compared (e.g. HCG 612, LCG 614, or LOFIC 618). Once a weight 634 is assigned to each absolute difference 630, the maximum weight (W) 638 may be selected by a module 636 and may be used by an LED Flicker Map (LFM) module 640 to generate the LFM bit 642, which, in turn, may be processed by an LED Flicker Map module 640 to detect and maps LED flickers that need to be corrected in the final corrected output (C) 628.

Finally, the CPR 622, LFM bit and S readout 606 are utilized to output 644 a corrected pixel readout (C) 646. The corrected pixel readout (C) 646 may be determined according to the equation C=(CPR*W)+S*(1−W).

In the context of this specification, the word 'module' refers to either an electronic circuit or software running on a computer or a controller. A person of ordinary skill would know how to design and apply such modules as a combination of active components (controllers, op-amps, transistors, etc.) and/or passive components (resistors, capacitors, etc.) when such modules are hardware based, and/or how to design a suitable software when such modules are software based. Furthermore, some or all modules may be implemented as a combination of hardware and software. In different embodiments, the described modules may be either external to the pixel array 102 (e.g., executed by the readout circuitry 104 and/or function logic 106) or internal to the pixel array 102.

The advantages of the disclosed invention over conventional methods allow the user to produce HDR images while mitigating LED flicker across a wide range of illuminances. By electrically coupling a LOFIC 432 to each LPD 414, there is no longer a need to expose the LPD twice, as the LOFIC readout captures the same range of illuminance that was previously captured by a spatially misaligned VS readout. Because the LOFIC 432 is electrically coupled to each LPD 414, three of the four readouts generated by a pixel 402 exposure (HCG, LCG, and LOFIC) need only be exposed for a single, short duration of time, resulting in a sharp image with a high dynamic range. This also allows the included SPDs 416 to be exposed for a longer duration simultaneously. In contrast, examples of conventional technologies that exclusively utilize LPDs produce blurry HCG/LCG/LOFIC readouts because the LPDs are exposed for a comparatively longer duration (e.g., 11.1 ms) to mitigate LED flicker, resulting in blurry images. Efforts to improve the quality of these images still present risk of blurriness, as they require a second LPD exposure. As discussed above, this second exposure increases the risk of spatial misalignment in the resulting image. The possibility of blur in the resulting image is not eliminated by the disclosed invention, given the prolonged exposure of the SPD 416; however, the disclosed invention allows the S readout to be utilized sparingly. As such, the disclosed invention's simultaneous exposure of SPDs and LPDs with LOFICs in a split pixel arrangement allows the user to produce HDR images while still mitigating LED flicker as required.

Many embodiments of the technology described above may take the form of a computer or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured, or constructed to perform one or more of the computer-executable instructions described above. Of course, any logic or algorithm described herein can be implemented in software or hardware or a combination of software and hardware.

The embodiments of the invention in which an exclusive property or privilege is claimed are defined as follows:

1. A pixel array for a CMOS image sensor, comprising:
a plurality of pixel cells formed in a semiconductor substrate, each pixel cell comprising:
a pixel photodiode region having at least a large photosensitive element (LPD) and a small photosensitive element (SPD), wherein a size of the LPD is greater than a size of the SPD, and wherein the LPD comprises a lateral overflow integrated capacitor (LOFIC); and
a pixel transistor region disposed adjacent to the pixel photodiode region;
wherein the LPD is exposed for a first duration of time during each exposure and the SPD is exposed for a second duration of time during each exposure;
wherein the first duration of time and the second duration of time are at least partially concurrent;
wherein for each exposure:
the LPD generates high-conversion gain (HCG), low-conversion gain (LCG) and LOFIC readouts; and
the SPD generates a short exposure(S) readout;
and wherein the HCG, LCG, LOFIC, and S readouts are combined into a combined pixel readout (CPR) based on determining a first absolute difference between the HCG readout and the S readout, or determining a second absolute difference between the LCG readout and the S readout, or determining a third absolute difference between the LOFIC readout and the S readout.

2. The pixel array of claim 1, wherein the first duration of time is less than the second duration of time, and wherein the LPD and SPD begin their respective exposures simultaneously.

3. The pixel array of claim 2, wherein the first duration of time is less than 5 ms and the second duration of time is greater than or equal to 11 ms.

4. The pixel array of claim 1, wherein the first duration of time is greater than the second duration of time, and wherein the LPD begins its exposure before the SPD begins its exposure.

5. The pixel array of claim 4, wherein the first duration of time is greater than or equal to 11 ms and the second duration of time is less than 5 ms.

6. The pixel array of claim 1, wherein the pixel cells are arrayed in a split diode tiling arrangement, wherein the arrangement comprises:

a plurality of LPDs; and a plurality of SPDs, wherein the plurality of LPDs and the plurality of SPDs are each arranged into rows and columns, wherein the plurality of LPDs are configured adjacent to one another, and wherein the plurality of SPDs is embedded between adjacent LPDs such that the LPDs and SPDs tessellate to share common boundaries with each other.

7. The pixel array of claim 6, wherein the plurality of LPDs and the plurality of SPDs each include two green photodiodes, one blue photodiode, and one red photodiode; and wherein the plurality of LPDs and the plurality of SPDs alternate colors by their respective rows and columns.

8. The pixel array of claim 1, wherein the CPR is a high dynamic range (HDR) image.

9. The pixel array of claim 1, wherein the HCG, LCG, LOFIC, and S readouts are combined into a combined pixel readout (CPR) by following steps:

shifting the S readout;

assigning a weight for each absolute difference determined;

selecting the maximum weight (W) computed for each absolute difference;

generating a flicker pixel map; and outputting a corrected pixel readout (C) based upon the CPR, flicker pixel map, and the SPD readout.

10. A method of generating a high dynamic range (HDR) image, comprising:

exposing a large photosensitive element (LPD) of a pixel cell for a first duration of time, wherein the LPD comprises a lateral overflow integrated capacitor (LOFIC), and wherein the LPD generates high-conversion gain (HCG), low-conversion gain (LCG) and LOFIC readouts;

exposing a small photosensitive element (SPD) of the pixel cell for a second duration of time, wherein the LPD is larger than the SPD, and wherein the SPD generates a short exposure(S) readout, and wherein the first duration of time and the second duration of time are at least partially concurrent; and combining the HCG, LCG, LOFIC, and S readouts into a combined pixel readout (CPR) based on determining a first absolute difference between the HCG readout and the S readout, or determining a second absolute difference between the LCG readout and the S readout, or determining a third absolute difference between the LOFIC readout and the S readout.

11. The method of claim 10, further comprising:

shifting the S readout;

assigning a weight for each absolute difference determined;

selecting the maximum weight (W) computed for each absolute difference;

generating a flicker pixel map; and outputting a corrected pixel readout (C) based upon the CPR, flicker pixel map, and the SPD readout.

12. The method of claim 11, wherein the corrected pixel readout (C) is calculated by the equation $C=(CPR*W)+S*(1-W)$.

13. The method of claim 10, wherein the first duration of time is less than the second duration of time, and wherein the LPD and SPD begin their respective exposures simultaneously.

14. The method of claim 13, wherein the first duration of time is less than 5 ms and the second duration of time is greater than or equal to 11 ms.

15. The method of claim 10, wherein the first duration of time is greater than the second duration of time, and wherein the LPD begins its exposure before the SPD begins its exposure.

16. The method of claim 15, wherein the first duration of time is greater than or equal to 11 ms and the second duration of time is less than 5 ms.

17. The method of claim 10, wherein the pixel cells are arrayed in a split diode tiling arrangement, wherein the arrangement comprises:

a plurality of LPDs; and a plurality of SPDs, wherein the plurality of LPDs and the plurality of SPDs are each arranged into rows and columns, wherein the plurality of LPDs are configured adjacent to one another, and wherein the plurality of SPDs is embedded between adjacent LPDs such that the LPDs and SPDs tessellate to share common boundaries with each other.

18. The method of claim 17, wherein the plurality of LPDs and the plurality of SPDs each include two green photodiodes, one blue photodiode, and one red photodiode; and wherein the plurality of LPDs and the plurality of SPDs alternate colors by their respective rows and columns.

19. The method of claim 10, wherein the CPR is a high dynamic range (HDR) image.

* * * * *